(12) United States Patent
Chung

(10) Patent No.: US 10,120,572 B2
(45) Date of Patent: Nov. 6, 2018

(54) COMPUTING DEVICE WITH A SEPARATE PROCESSOR PROVIDED WITH MANAGEMENT FUNCTIONALITY THROUGH A SEPARATE INTERFACE WITH THE INTERFACE BUS

(71) Applicant: Keicy Chung, Torrance, CA (US)

(72) Inventor: Keicy Chung, Torrance, CA (US)

( * ) Notice: Subject to any disclaimer, the term of this patent is extended or adjusted under 35 U.S.C. 154(b) by 0 days.

(21) Appl. No.: 15/077,411

(22) Filed: Mar. 22, 2016

(65) Prior Publication Data

US 2016/0371006 A1 Dec. 22, 2016

Related U.S. Application Data

(63) Continuation of application No. 14/320,933, filed on Jul. 1, 2014, now Pat. No. 9,292,222, which is a
(Continued)

(51) Int. Cl.
*G06F 12/00* (2006.01)
*G06F 3/06* (2006.01)
(Continued)

(52) U.S. Cl.
CPC ............ *G06F 3/0604* (2013.01); *G06F 3/061* (2013.01); *G06F 3/067* (2013.01); *G06F 3/0637* (2013.01);
(Continued)

(58) Field of Classification Search
CPC .... G06F 3/0604; G06F 3/0637; G06F 3/0643; G06F 3/0659; G06F 3/067; G06F 3/061;
(Continued)

(56) References Cited

U.S. PATENT DOCUMENTS 5,313,631 A   5/1994 Kao
5,457,796 A   10/1995 Thompson
(Continued)

FOREIGN PATENT DOCUMENTS

EP   515073   11/1992
JP   11355357   12/1999
JP   200186168   3/2001

OTHER PUBLICATIONS

Maekawa et al., Distributed Operating System, Japan, 258-2614, Brent Callaghan, NFS Bible, Japan, ASCII Inc., Kenichi Suzuki, Oct. 1, 2001 First Edition, pp. 346-348.

*Primary Examiner* — Mardochee Chery
(74) *Attorney, Agent, or Firm* — The Belles Group, P.C.

(57) ABSTRACT

A computing device includes a first processor; a second processor; a network interface communicably coupling the first and second processors to a network; an interface bus communicably coupling the first processor to the second processor; a first interface communicably coupling the second processor to the interface bus; a second interface communicably coupling the second processor to the interface bus, the second interface being separate from the first interface, wherein the second interface is configured to provide the second processor with management functionality over one or more hardware components of the computing device; and storage means communicably coupled to the second processor, wherein the second processor regulates access of the first processor to the storage means.

24 Claims, 6 Drawing Sheets

Related U.S. Application Data continuation of application No. 12/113,294, filed on May 1, 2008, now Pat. No. 8,769,185.

(60) Provisional application No. 60/981,866, filed on Oct. 23, 2007.

(51) Int. Cl.
  *G06F 12/0866* (2016.01)
  *H04L 29/08* (2006.01)
  *H04L 12/911* (2013.01)
  *H04L 29/06* (2006.01)

(52) U.S. Cl.
  CPC .......... *G06F 3/0643* (2013.01); *G06F 3/0655* (2013.01); *G06F 3/0659* (2013.01); *G06F 3/0667* (2013.01); *G06F 12/0866* (2013.01); *H04L 29/08846* (2013.01); *H04L 47/82* (2013.01); *H04L 63/062* (2013.01); *H04L 67/1097* (2013.01); *H04L 67/28* (2013.01); *G06F 2212/154* (2013.01); *G06F 2212/174* (2013.01); *G06F 2212/2146* (2013.01); *G06F 2212/264* (2013.01); *G06F 2212/305* (2013.01); *G06F 2212/3042* (2013.01); *G06F 2212/463* (2013.01); *G11B 2220/211* (2013.01); *H04L 63/0428* (2013.01)

(58) Field of Classification Search
  CPC .. G06F 3/0655; G06F 3/0667; G06F 12/0866; H04L 47/82; H04L 67/1097; H04L 63/062; H04L 67/28; H04L 29/08846
  USPC .......................................................... 711/2
  See application file for complete search history.

(56) References Cited

U.S. PATENT DOCUMENTS

| | | |
|---|---|---|
| 5,628,005 A | 5/1997 | Hurvig |
| 5,636,359 A | 6/1997 | Beardsley et al. |
| 5,644,782 A | 7/1997 | Yeates et al. |
| 5,740,370 A | 4/1998 | Battersby et al. |
| 5,751,995 A | 5/1998 | Sarangdhar |
| 5,758,185 A | 5/1998 | Takano et al. |
| 5,790,848 A | 8/1998 | Wlaschin |
| 5,802,299 A | 9/1998 | Logan et al. |
| 5,806,074 A | 9/1998 | Souder et al. |
| 5,829,012 A | 10/1998 | Marlan et al. |
| 5,832,263 A | 11/1998 | Hansen et al. |
| 5,873,118 A | 2/1999 | Letwin |
| 5,881,229 A | 3/1999 | Singh et al. |
| 5,901,327 A | 5/1999 | Ofek |
| 5,915,094 A | 6/1999 | Kouloheris et al. |
| 5,935,207 A | 8/1999 | Logue et al. |
| 5,956,716 A | 9/1999 | Kenner et al. |
| 5,978,802 A | 11/1999 | Hurvig |
| 5,987,571 A | 11/1999 | Shibata et al. |
| 5,996,022 A | 11/1999 | Krueger et al. |
| 6,006,299 A | 12/1999 | Wang et al. |
| 6,061,731 A | 5/2000 | Blakeslee |
| 6,061,740 A | 5/2000 | Ferguson et al. |
| 6,065,099 A | 5/2000 | Clark et al. |
| 6,088,694 A | 7/2000 | Burns et al. |
| 6,134,583 A | 10/2000 | Herriot |
| 6,148,298 A | 11/2000 | Lastrange et al. |
| 6,167,490 A | 12/2000 | Levy et al. |
| 6,263,402 B1 | 7/2001 | Ronstrom et al. |
| 6,275,953 B1 | 8/2001 | Vahalia et al. |
| 6,292,852 B1 | 9/2001 | Bodo et al. |
| 6,327,614 B1 | 12/2001 | Asano et al. |
| 6,377,991 B1 | 4/2002 | Smith et al. |
| 6,434,548 B1 | 8/2002 | Emens et al. |
| 6,442,601 B1 | 8/2002 | Gampper et al. |
| 6,442,651 B2 | 8/2002 | Crow et al. |
| 6,553,411 B1 | 4/2003 | Dias et al. |
| 6,623,529 B1 | 9/2003 | Lakritz |
| 6,651,141 B2 | 11/2003 | Adrangi |
| 6,701,415 B1 | 3/2004 | Hendren, III |
| 6,714,996 B1 | 3/2004 | Kobayashi et al. |
| 6,732,237 B1 | 5/2004 | Jacobs et al. |
| 6,745,295 B2 | 6/2004 | Rodriguez |
| 6,775,695 B1 | 8/2004 | Sarukkai |
| 7,127,477 B2 | 10/2006 | Duncombe et al. |
| 2002/0002603 A1 | 1/2002 | Vange |
| 2002/0073167 A1 | 6/2002 | Powell et al. |
| 2002/0107935 A1 | 8/2002 | Lowery et al. |
| 2002/0110084 A1 | 8/2002 | Butt et al. |
| 2002/0178341 A1 | 11/2002 | Frank |
| 2003/0028731 A1 | 2/2003 | Spiers et al. |
| 2003/0074497 A1 | 4/2003 | Hirabayashi et al. |
| 2003/0084152 A1 | 5/2003 | Chung |
| 2004/0049598 A1 | 3/2004 | Tucker et al. |
| 2004/0172495 A1 | 9/2004 | Gut et al. |
| 2004/0243727 A1 | 12/2004 | Chung |
| 2004/0267902 A1 | 12/2004 | Yang |
| 2005/0165837 A1 | 7/2005 | Dmitrovich et al. |
| 2006/0277288 A1 | 12/2006 | Kelly et al. |
| 2007/0088857 A1 | 4/2007 | Schluessler et al. |
| 2007/0174920 A1 | 7/2007 | Thibadeau |
| 2010/0186076 A1 | 7/2010 | Ali et al. |

COMPUTING DEVICE WITH A SEPARATE PROCESSOR PROVIDED WITH MANAGEMENT FUNCTIONALITY THROUGH A SEPARATE INTERFACE WITH THE INTERFACE BUS

CROSS REFERENCE TO RELATED APPLICATIONS

Priority is claimed as a continuation to U.S. patent application Ser. No. 14/320,933, filed Jul. 1, 2014 (now U.S. Pat. No. 9,292,222), which is a continuation of U.S. patent application Ser. No. 12/113,294, filed May 1, 2008 (now U.S. Pat. No. 8,769,185), which claims priority to U.S. provisional patent application Ser. No. 60/981,866, filed Oct. 23, 2007. The disclosure of the aforementioned priority documents are incorporated herein by reference as if set forth in full.

RELATED APPLICATIONS

The present application is related to U.S. Pat. No. 7,069,351, issued on Jun. 27, 2006, U.S. Pat. No. 7,444,393, issued Oct. 28, 2008, and U.S. patent application Ser. No. 13/428,219, filed Mar. 23, 2012, the disclosures of which are incorporated herein by reference as if set forth in full.

FIELD OF THE INVENTION

The field of the present invention is networkable storage devices for computers and computer networks.

BACKGROUND OF THE INVENTION

A typical computer, whether it is an off-the-shelf or a customized computer for personal, business, specialty, or other uses, has many components. Some of the common components are processors, memories, storage devices, input and output devices, and network interfaces. The operating system, such as Microsoft Windows®, Mac OS®, UNIX, Linux, and the like is responsible for controlling the components, their functions, and their interactions. In particular, the operating system handles file requests from applications or from the operating system itself. When a file request is received, the operating system attempts to supply the file from a local storage device or from a file server if the computer is connected to a network.

Because there are many different options available for storage devices and network interfaces, the operating system is typically programmed with the characteristics necessary to access almost every storage device and network interface that could be connected to the computer. For instance, most operating systems are programmed to accommodate different storage devices having various storage device types (e.g. magnetic, optical, etc.), interface types (e.g. IDE, ATA, SCSI, SATA, PATA, SAS, etc.), and physical parameters (e.g. number of cylinders, sectors, heads, tracks, etc.). If the computer is connected to a network, the operating system also has to be programmed with the various network interface types (e.g. Ethernet, Token Ring, ATM, etc.), the network protocols (e.g. TCP/IP, IPX/SPX, AppleTalk, SNA, etc.), and any particular methods needed to communicate with network resources (e.g. servers, printers, scanners, storage, etc.).

In addition, the operating system also has to be able to manage files on storage devices or on a file server over a network. On local storage devices, the operating system typically uses lookup tables or indices, usually referred as file allocation tables, to manage the files. On a network, the operating system has to be programmed to communicate with a file server and retrieve files. It is often advantageous for the operating system to translate the file information received from a file server into a format resembling the file allocation tables to simplify the file retrieval process.

The way in which an operating system manages components and their functions add complexity to a computer. The complexity is easily seen during the setup process of a computer. Typically, a computer goes through a setup process that would involve (a) booting from a bootable device that can initiate installation of the selected operating system, (b) partitioning and formatting local storage devices, (c) installing the full operating system, (d) configuring hardware components such as the display card and network interface, (e) installing and configuring applications and other software, until the computer is prepared for everyday general use.

The complexity is also evident while the computer is in use. Applications and the operating system may require periodic patches or updates, the installation of which frequently involves uninstalling the older versions of the applications or components of the operating system. Additionally, files may be corrupted due to program errors, user errors, or computer viruses. When this happens, the corrupted files need to be replaced or repaired, a process that may involve reinstalling the applications that use the corrupted files or even possibly reinstalling the operating system itself.

The complexity involved in using a computer usually results in high maintenance and support costs being incurred. In a business environment, the support costs can easily reach thousands of dollars per user or per computing device. Additionally, the cost of maintaining computers increases because work productivity tends to decrease significantly, often to zero, when computer related problems arise.

Problems related to hardware malfunction, except problems related to storage devices, may often be resolved within a short amount of time. For instance, a broken component, such as a video card or a network interface card, may be quickly replaced with an identical component. However, computer repair may become a lengthy process if the problems are related to storage devices or the files stored on the storage devices. When a hard drive in a computer malfunctions or corrupted files cause problems, the repair and recovery process might involve reinitializing the hard drive, reinstalling the operating system, and/or reinstalling applications.

Numerous methods are presently available to reduce the complexity of computers, shorten the recovery process when problems occur, or to minimize the need for a recovery process altogether. Some of the common methods are cloning the storage device, booting the computer over a network, utilizing specialized computer management software, and/or applying file level security.

By cloning the storage device, the installation process may be shortened. A computer is first completely set up with a full set of applications. Then the storage device is cloned or duplicated as an "image" file. The image file may then be used to reset the computer to its original condition or to set up identically equipped computers, Many consumer-oriented computers come with recovery CD's containing the factory default image that can be used to restore the storage device to its factory default condition. The drawback of this method is that a new image of the storage device has to be created whenever there is a change in the operating system, applications, or any other files stored on the storage device. Complications may arise using this method in instances when it is necessary to apply patches or updates to the installed software after the storage device is restored from an old image. Customization of final configuration for a user, for instance, might take several hours even if the image is kept up to date.

The network boot method is often used in conjunction with simple computers that download necessary files from a file server on a network. The computer usually uses a well-known network service, such as BOOTP, TFTP, or PXE, to download and execute a small basic portion of an operating system, which in turn can start downloading the rest of the operating system and any applications. The drawback of this method is that if the computer does not have a local storage device, it has to go through the same boot process of downloading needed files whenever it is powered on or reset. If the computer has a local storage device, this process can benefit by storing downloaded files locally. But then the operating system downloaded over the network is, once again, responsible for the complex tasks of managing hardware components and files stored on the local storage device.

The computer management software method is used to enhance the operating system by adding additional software components as agents, daemons, or services. One typical way of using this method is to use anti-virus software that constantly scans stored files for any computer virus or other malware infection. This method may also be implemented by adding a software component that constantly monitors important files on the local storage device and attempts to self-heal any damaged or corrupted files. An additional implementation adds a software component that handles file updates pushed out from a server as a part of a computer management tool. The drawback of this method is that the software components acting as agents, daemons, or services are highly dependent on the operating system. For instance, a software component written for Microsoft Windows would not work under Linux. Thus, the operating system has to provide necessary functions, such as managing local storage devices or network interfaces, for these software components to work properly.

Many operating systems can also apply file level or directory level security to provide certain level of protection against computer viruses, malware, unauthorized access, user errors, or application errors that can corrupt important files. The drawback of this method is that it is again operating system dependant, and a super user, an administrator, or a process running with full access privileges can accidentally modify, delete, or corrupt important files in the local storage. Moreover, many malicious programs, such as viruses that have gained full access privileges, can inflict detrimental damage.

The above methods, by themselves or in combination with other methods, provide some help in reducing the complexities involved with computers. However, none of the methods fundamentally changes how the operating system manages the components of a computer. Thus, a new approach is needed for operating computers and simplifying the manner in which files are handled or distributed over a network.

In addition, one of the growing concerns in today's computing environment has to do with data security. Computing devices are often stolen, lost, or thrown out while the storage device in the computing devices may contain sensitive data. Anyone who has gained physical access to the computing device or the storage device can easily access the data stored in the storage device in many ways. For instance, one can boot the computer with an alternate operating system and gain access to the data. One can crack the administrator or user accounts and passwords by using a password recovery tools. Or one can simply remove a storage device from a company's computing device and hand over the storage device with user account and password to a competing company in industrial espionage. If the data are not backed up to or synchronized with a file server, then everything is lost to an unauthorized party.

There are many methods to deter unauthorized access to files and data stored in a storage device. The methods generally fall into two categories: (a) operating system based access controls and (b) external hardware dependent access controls.

In the case of operating system based access controls, the operating system might use an encrypted file system (EFS) to encrypt the data stored in the storage device. But, such a method is operating system dependent. If the operating system is compromised (i.e. the encryption key for EFS is exposed), or if the user account and password are cracked or known to an unauthorized party, such operating system based access controls would not be able to safeguard the data.

In the case of external hardware dependent access controls, an external device, such as a SmartCard or a USB key, might be used to control access to the data. For instance, a SmartCard can be used to during the boot process before an operating system is fully loaded. If a valid SmartCard is found, then the boot process can continue loading the operating system that would grant access to data, most likely in EFS. This would be more secure than operating system based access controls alone, but it would be dependent on the external hardware. If the hardware is damaged without a backup, then even an authorized user can not gain access to the data. If a recovery procedure were to exist, then an unauthorized party could use the recovery procedure to gain access to data. Also, the external hardware (i.e., a copy of a SmartCard or a USB key) along with the storage device might be handed over to an unauthorized party in industrial espionage. To prevent this kind of unauthorized access, the operating system may also use a "connectedness policy" in addition to the external hardware. For instance, after a SmartCard is verified during the boot process, the operating system may check with a network server for connectedness before allowing access to the data. But, this method is also operating system dependent. That is, if a particular operating system that a user or an application prefers does not provide this kind of access control, then there is no way to benefit from such access control. Therefore, a new approach to safeguarding data in a storage device is needed, preferably one that is independent of the operating system running on the computing device.

Furthermore, a certain degree of asset management (both hardware and software asset management) and support management of end user computing devices are highly desirable in a corporate computing environment. Hardware and software asset management is often accomplished with a use of an "asset management agent" that gets installed on end users' computing devices. Depending on the implementation, the agent can query and report hardware components to a management station. The agent is able to detect any changes in hardware configuration or unauthorized activities such as the computing device case being opened. The agent can also query files stored in local storage devices and report to a management station what kind of software is installed on end users' computing devices. Based on information reported by the agent, hardware or software asset reports can be generated on the management station.

Such asset management agents are again highly operating system dependent. That is, many agents would need to be developed and written for all kinds and versions of operating systems (e.g. Windows XP, Windows Vista, Linux, UNIX, MacOS, etc.). Unless the agent is developed with some level of sophistication (i.e., not only checking the software file names but also checking certain traits of the software, such as an MD5 checksum, or the like), the agent can be fooled to report software assets incorrectly. For instance, if an end user wants to use an application that is not officially allowed or supported by the company, the user may rename the application executable to a common one, such as NOTEPAD.EXE, so that the application does not get reported to the management station. In the same way, a malicious program can disguise itself as an authorized application.

The user or a malicious program may also fool the agent to make it appear as if the user has a certain application running on the system or existing in the user's local storage device. In today's highly security-oriented computing environment, certain firewalls or gateway/proxy devices try to detect if the end user's computing device has certain applications running or not (i.e., whether an anti-virus software is running or not). Such firewalls or gateway/proxy devices would use an agent to detect the presence of required applications. Unless the agent can detect all flavors and versions of required applications, the user can change the name of an application and bypass the agent's query. For instance, the user can make a duplicate copy of NOTEPAD.EXE as NTRTSCAN.EXE, run and minimize the hoax NTRTSCAN.EXE to circumvent the agent's attempt to check if Trend Micro's OfficeScan application is running or not.

Such asset management agents are also not able to assess hardware components if the computing device is turned off. The agent has to be running on the computing device for the agent to be able to collect asset information and report to the management station. This means that the computing device has to be fully functional. The operating system has to be running correctly with many dependant services/daemons (such as network interface drivers and network protocols). Otherwise, the agent would not be able to provide any hardware or software asset information to a management station There are numerous methods currently available for remotely controlling computing devices (i.e. power on or power off). Wake-On-LAN, for instance, is one of such methods that an administrator can use to turn on a computing device remotely so that the asset management agent can provide asset information to the management station. But being able to remotely power on a computing device would not do any good if the computing device is unbootable (i.e. OS is not loaded correctly or there is a faulty hardware component). In this case, the agent would not be loaded and would not be able to provide asset information to the management station. Therefore, a different approach, generally called "out-of-band management", has been developed for managing and troubleshooting computing devices that do not operate correctly.

Out-of-band management is widely used in today's computing environment. It can simply provide remote view of computing device's console for troubleshooting. Many implementations of out-of-band management provide additional functions and information, such as power control and health check of system components (e.g. whether a local storage device is bad, whether there is a memory error, whether the computing device's internal temperature is too high for it to operate properly, etc.). This kind of management is usually accomplished by using an add-on management board or a management component built into the computing device's system board. Many servers used in the corporate environment have such management options that enable remote administration of servers. Since the add-on management board or the built-in management component can have constant power (either via a dedicated power supply or from the always-on system board), it can provide hardware-related information to the management station even if the computing device is powered off, independent of the operating system or an asset management agent.

Such add-on management boards or built-in management components have at least one major limitation—they cannot query a local storage device and generate a software asset list. This limitation is mainly due to the fundamental architecture of today's computing devices where no more than one operating system can control a local storage device. An operating system that is responsible for managing a local storage device builds a file system unique to the operating system. For instance, Microsoft Windows may use NTFS, and this file system cannot be recognized natively by Linux or MacOS. In addition, Microsoft Windows does not natively recognize file systems created by the Linux or UNIX operating systems. Therefore, if an add-on management board or a built-in management component were to be able to scan a local storage device, the add-on management board or the built-in management component would have to understand the file system in use. That is, the firmware running on the add-on management board or the built-in management component should be compatible with the operating system running on the computing device. This would be a serious limitation since there are many varieties of operating systems a computing device would use. Even if the firmware running on the add-on management board or the built-in management component was made fully compatible with the operating system running on the computing device, sharing the file system (possibly with directory and file level security as well) between the operating system and the firmware would likely introduce additional complications in that the file system could easily be corrupted, requiring significant attention to repair.

Thus, for an administrator to have a complete hardware and software asset management capability, a combination of a hardware-based approach (i.e. add-on management board or built-in management component) and a software-based approach (i.e. asset management agent) is ideal. Because a hardware-based approach would add complexity to the system and because software-based approach is highly operating system dependent, a new simplified approach is needed.

Basically, the root cause of problems existing in today's computing environment is contributed by the operating system that has inherent vulnerabilities arising from the operating system's kernel mode that controls every component of the computing device or the user's ability (and necessity) to have elevated access rights (e.g. administrative or root rights). For instance, most, if not all, computing devices are booted with an operating system that controls peripheral devices (e.g. a hard disk drive), and the operating system has an elevated access mode that the operating system itself or a user needs to configure the operating system and the peripheral devices. Malicious users or programs are constantly exploiting these elevated access modes to gain unauthorized access or to make the computing device non-functional. Operating systems and applications have become more and more complicated to prevent such exploitation, but fundamentally no effective cure is currently known.

One of the recent developments in an attempt to minimize the malicious exploitation and to increase the manageability is the virtualization of the user's computing environment. Virtualization is accomplished by booting a computing device with a host operating system (usually with a "hardened" operating system) to provide a virtual machine that has virtual storage devices, virtual network connections, etc. The virtual machine is then booted with a guest operating system for the user. For instance, an Apple® Mac is booted with Mac OS® Virtual PC® is started to create a virtual machine, and then the virtual machine is booted with Windows XP® so that the user can use Windows® applications. Or a server is booted with Windows Server 2003®, VMWare® server is started to create multiple virtual machines, and then the virtual machines are booted with various operating systems. Snapshots of a virtual machine can be taken to save the states of the virtual machine so that the virtual machine can be restored quickly if the virtual machine encounters a problem. If a server is configured to support multiple virtual machines for users, it would fall into centralized server-based computing or thin-client computing as the users can access the virtual machines remotely while transferring keyboard, mouse, and video signals over the network.

There are numerous advantages that server-based computing or thin-client computing has, such as limited direct user access to the server hardware and software components and ability use low spec devices as user stations. But server-based computing or thin-client computing has several disadvantages as well, such as the server needs to be powerful enough to support all users and, more restrictively, all user stations need to be connected to the server at all times to enable the users to use the applications available on the server.

Moreover, virtual machines running guest operating systems still have inherent vulnerabilities that can be exploited by malicious users or programs. For instance, the virtual machines would still need anti-virus software and a way to control file permissions, just like regular computing devices. And no matter how much the host operating system is hardened (protected), the host operating system still has elevated access modes that can be exploited. For instance, a malicious user or program that gained administrative rights on the host operating system can corrupt or configure the software components that provide virtual storage devices to virtual machines and cause all virtual machines inaccessible. Therefore, it is highly desirable to reduce exposure of the files and data used by the operating system and applications to malicious users or programs.

SUMMARY OF THE INVENTION

The present invention is directed to a storage device for computers and computer systems. The storage device includes a processor communicably connected to a computer through a computer interface and a system interface. The processor is also communicably connected to a network through a network interface. The computer interface enables communications exclusively between the processor and the computer, and the system interface enables to processor to manage one or more hardware components of the computer. The network interface enables the processor to communicate over a network with select file servers to the exclusion of other file servers. A storage means is communicably connected to the processor and includes first and second designated storage sections. The processor has read-write access to both storage sections, while the computer has read-only access to the first storage section and read-write access to the second storage section. A removable media storage component is also communicably connected to the processor.

The storage device may be constructed with additional options to improve functionality of the storage device and the computer to which it is associated. Any of these options may be implemented on their own or in combination. As one option the storage device may include an encryption module, with the processor being adapted to utilize the encryption module for one or more encryption/decryption functions. Such functions may include encrypted communications with the select file servers, encrypted storage of files on the storage means, and encrypted storage of files using the removable media storage component. Encryption keys used by the encryption module may be obtained from one of the select file servers.

As another option, the processor may be programmed to follow a series of sequential steps when a request for a file is received from the computer. First, the processor determines whether the file is cached within the first designated storage section, and if the file is there, provides the file to the computer on a read-only basis. Next, if the file is not found cached, the processor requests the file from one or more of the select file servers. If the file is available from one of the select file servers, the file is retrieved, cached within the first designated storage area, and provided to the computer on a read-only basis. Lastly, if the file is not otherwise found, a file unavailable notice is retuned to the computer. As an additional step within this sequence, the processor may be programmed to determine whether the file is available from the removable media storage component if the file is not available from one of the select file servers. As before, if the file is available, it is cached and provided to the computer on a read-only basis.

As yet another option, the processor may be programmed to monitor, control, and/or process user files written to the second designated storage section. Also, if the computer is communicably connected to a network through the network interface, the processor may be programmed to monitor, control, and/or process network traffic passing through the network interface to and from the computer.

As yet another option, the storage device may be programmed to copy user files stored within the second designated storage area, whether for backup or archive purposes, to the removable media storage component. Alternatively, or in addition, the storage device may be programmed to copy user files stored within the second designated storage area to one or more of the select file servers.

As yet another option, the processor may be adapted to delete a cached file from the storage means upon receiving a delete command for the cached file from one or more of the select file servers. Alternatively, the cached files may include a file expiration tag, with the processor being adapted to delete a cached file according to criteria determined by the file expiration tag. Such tags may include an absolute time and date stamp, a relative time and date stamp, or some other non-time related criteria which serves as indicia for when the file should be deleted.

The present invention is also directed toward a computing device which includes a first processor and a second processor. A network interface communicably couples the first and second processors to a network, and an interface bus communicably couples the first processor to the second processor. The second processor is communicably coupled to the interface bus by a first interface and by a second interface, the second interface being separate from the first interface. the second interface is configured to provide the second processor with management functionality over one or more hardware components of the computing device. A storage means is communicably coupled to the second processor, and the second processor regulates access of the first processor to the storage means Accordingly, an intelligent storage device for use with computing devices and an improved computing device are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE INVENTION

For purposes of the present description, the term "non-user file" means a file that is a component of an operating system of a computer, a component of an application, or a file that is designated as one to which a user should have read-only access. The term "user file" as used herein means a file that is not defined as a non-user file and is usually generated as a direct result of the user's use of the computing device. Such user files may include temporary files generated by the operating system or the applications for the benefit of the user. Under these definitions, the delineation between a non-user file and a user file is preferably determined by computer and network administrators for any particular computer and network. Thus, one skilled in the art will recognize that different administrators may elect to place the same file in different categories, i.e., the administrator of a first network may choose to treat a particular file as a non-user file, while the administrator of a second network may choose to treat the exact same file as a user file.

In addition, the term "server" encompasses both a computing device configured to operate as an independent server on a network and a "virtual server", which effectively simulates the functionality of an independent server in software and enables multiple virtual servers to be hosted by a single networked computing device. While some virtual servers may only simulate the functionality necessary to perform the function of a server, other virtual servers may simulate part or all of the hardware components of a computing device in order to replicate the desired server functionality.

Figure 1:
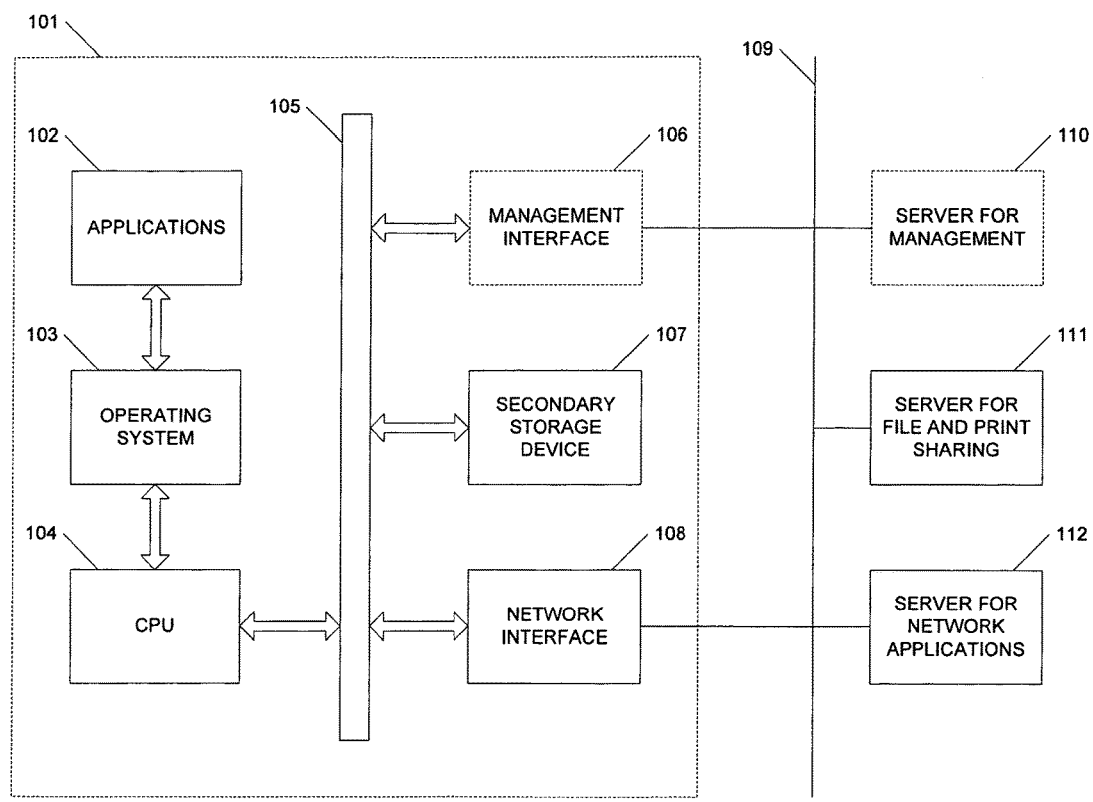
FIG. 1 is a schematic diagram of a networked computer having an asset management interface according to the prior art.

Turning in detail to the drawings, FIG. 1 is representative of a typical networked computer 101 as exhibited in the prior art. The networked computer 101 may be a personal or business computer, whether an off-the-shelf or a custom built computer, a networked server, or it may be a specialty device such as a personal digital assistant (PDA), a telephone, or any networked, programmable device or appliance. The computer 101 is shown with common components such as the central processing unit 104; the internal interface bus 105 that connects and allows communication between the various components; the secondary storage device 107, such as a hard disk drive or non-volatile random access memory, where the operating system 103 and applications 102 typically store necessary files; the network interface 108, which may be wireless or wired and is used to connect the computer 101 to a network 109 having network resources such as a file and print sharing server 111 and/or a network applications server 112; and an optional network management interface 106 that can be used for "out-of-band management". These components are common to networked computers and are therefore well known to those skilled in the art.

The operating system 103 is responsible for managing the interaction between the components to form a functional computer. In particular, the operating system 103 handles file requests that may originate from applications 102 or from the operating system 103 itself. These file requests arise when the applications 102 or the operating system 103 require access to a file which resides on either the secondary storage device 107, the file and print sharing server 111, or the network applications server 112. To handle the file requests, the operating system 103 is programmed with the characteristics of the secondary storage device 107 and network interface 107 to account for a wide variety of storage devices and network protocols that may be used in conjunction with the computer. The operating system 103 is also programmed with information that enables it to keep track of files stored on the secondary storage device 107 and how to integrate into the computer's operation the various resources which are available from various network servers 111, 112. Therefore, under normal operating circumstances, the operating system 10 of the computer 101 addresses many different complex tasks.

The management interface 106 can be used in any computing device, but is presently most widely used in networked servers. The management interface 106 allows an administrator to remotely manage the servers and collect information on hardware components or operating status. Using the management interface 106, an administrator can power-on or power off the computer 101, view POST (power-on self-test—a pre-boot process) messages sequence, or can have remote-console capability as an extension of keyboard, video, and mouse (KVM). The management interface 106 can also be programmed to report the operating status to the server for management 110 at regular interval or whenever there's a critical event, such as a secondary storage device 107 or the memory going bad. The management interface can be an add-on board or can be built onto the primary system board of the computing device and can provide many functions well known to those skilled in the art.

Figure 2:
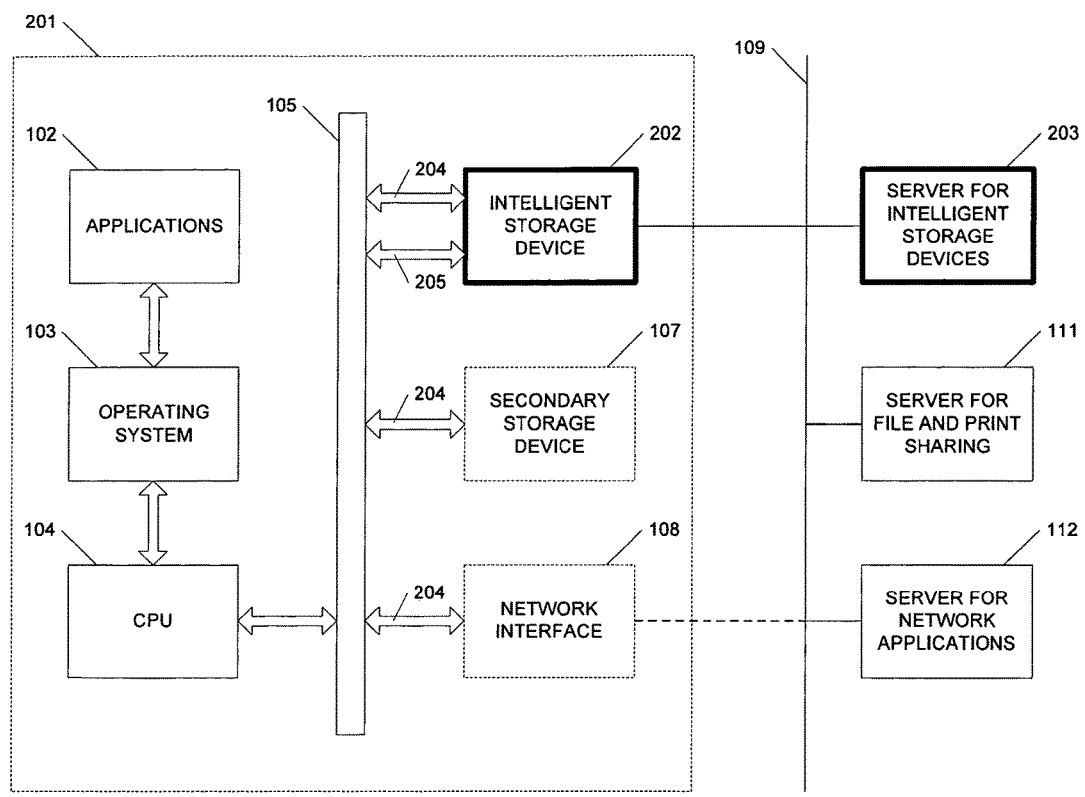
FIG. 2 is a schematic diagram of an intelligent storage device incorporated into a networked computer using a first networking scheme.

FIG. 2 illustrates a networked computer 201 which includes an internally incorporated intelligent storage device (ISD) 202. The ISD 202 may also be external to the computer 201 without losing any of the functionality described herein. As in the prior art, the computer 201 includes a CPU 104 and an interface bus 105. A secondary storage device 107 and a network interface 108 are included, but are optional in certain cases because the ISD 202 can provide the necessary functions. The ISD 202 and other components are connected to the interface bus 105 using computer interfaces 204 which are appropriate for each component. The ISD 202 has an additional connection to the interface bus 105 through a management interface 205, which enables the ISD 202 to manage various hardware components of the computer 201. Depending on the design, the interface bus 105 may have multitude of channels, each specific to certain functionality as is well known to those skilled in the art.

The computer 201 in FIG. 2 is connected to three different kinds of servers residing on a single network, although in alternative designs the different servers could reside on different networks. The first server is a server for intelligent storage devices (SISD) 203, which communicates primarily with ISD's on the network. It may be desirable, but not necessary, to have ISD's be the only device type on the network that communicates with the SISD 203. In other words, the SISD 203 will not communicate with any device other than ISD's, and the ISD's will not communicate with any server other than the SISD 203. However, if the ISD 202 is limited to communication with only the SISD 203, any pass-thru connection the ISD 202 provides to the computer 201 would not be limited to SISD 203. In fact, via the pass-thru connection, the computer 201 may communicate with the second and third servers 111, 112 on the network.

Those skilled in the art will recognize that many alternative server and network configurations are possible. For example, two or more of the servers could be hosted as virtual servers by a single computing device. Alternatively, more servers could be added to introduce redundancy or additional functionality into the network environment. The network may be constructed in any desirable manner. For example, the network may be formed using copper wiring, optical fibers, wireless communications or any type, and the like.

Figure 3:
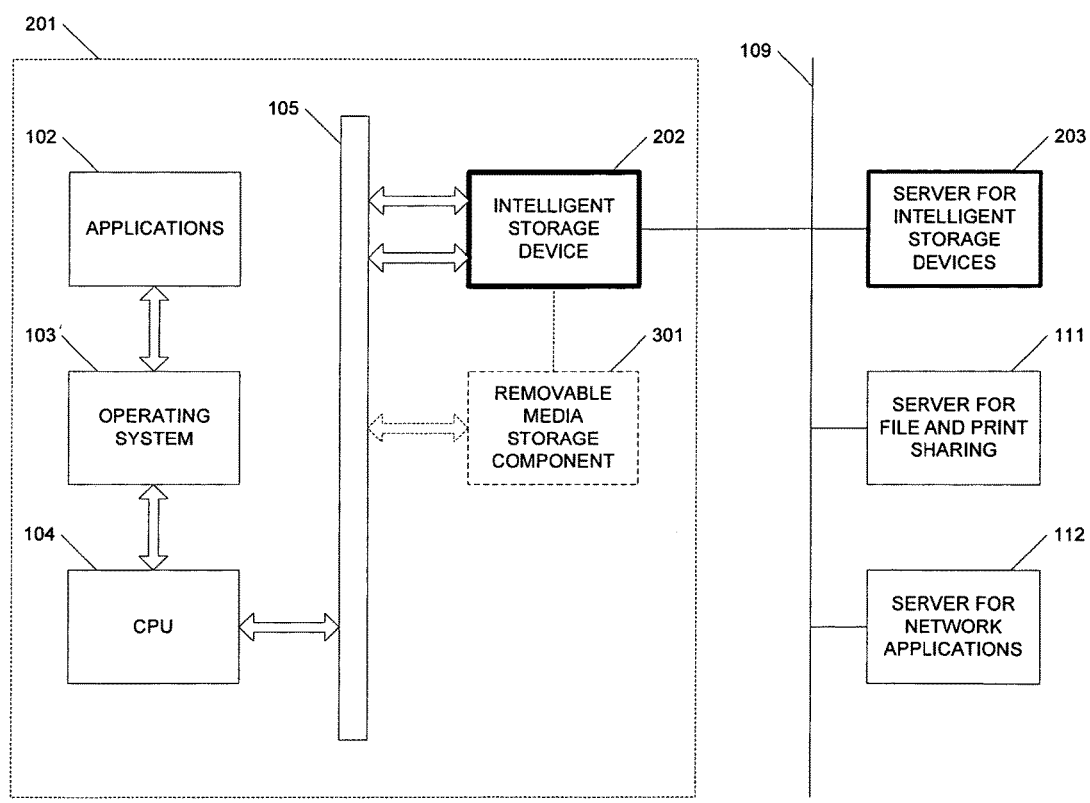
FIG. 3 is a schematic diagram of an intelligent storage device incorporated into a networked computer using a second networking scheme.

FIG. 3 illustrates a networked computer 201 which includes an ISD 202 and a removable media storage component 301 that can be shared between the ISD 202 and other components of the computer 201. For instance, the removable media storage component 301 may be a DVD drive, with applications 102, the operating system 103, and the ISD 202 having direct access to the DVD drive. Alternatively, the applications 102 and the operating system 103 may be forced to access the DVD drive solely through the ISD 202 (i.e., there is no direct interface between the removable media storage component 301 and the interface bus 105) so that the ISD 202 can allow or disallow use of the removable media storage component 301. The removable media storage component 301 may be any type of removable media, from CD and DVD drives, to RAM drives, to USB thumb drives, and the like.

Figure 4:
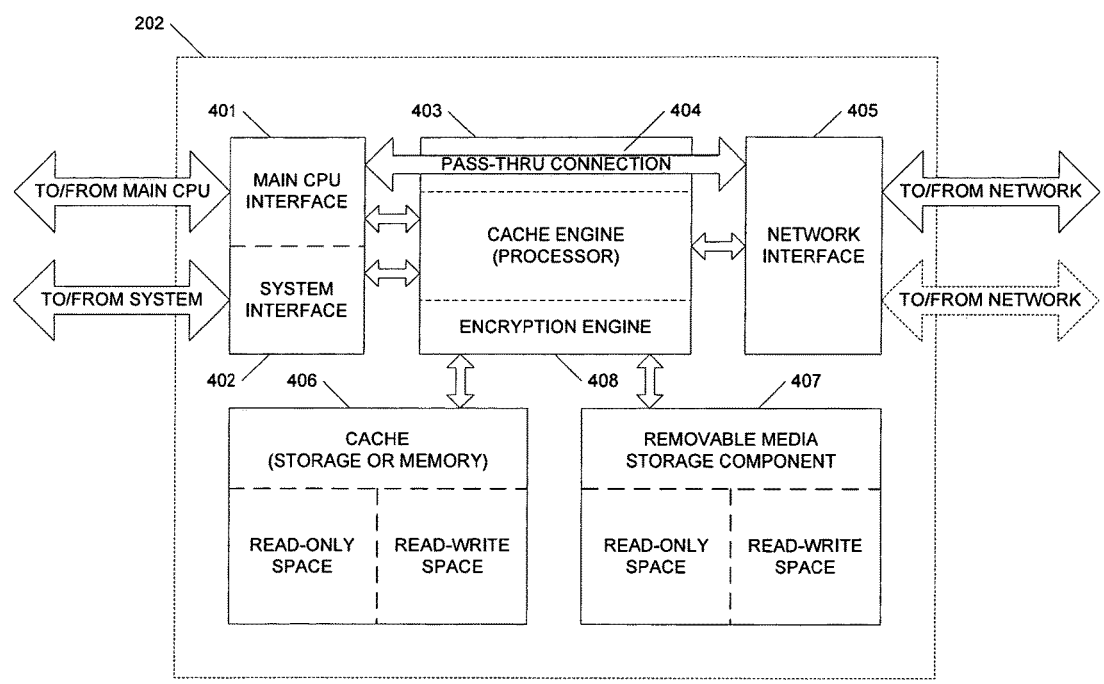
FIG. 4 is a schematic diagram of a first intelligent storage device.

FIG. 4 illustrates an ISD 202 and its six basic components. The ISD 202 includes the processor 403 (also referred to as the cache engine), the main CPU interface 401 the system interface 402, the network interface 405, the cache 406 (also referred to as the storage means), and the removable media storage component 407. The ISD 202 is intended to be used in conjunction with a computer, as shown in FIGS. 2 & 3, to simplify and off-load certain tasks typically performed by the operating system.

The cache engine 403 is communicably connected to and manages the other components of the ISD 202. To assist in these functions, the cache engine 403 includes a pass-through connection 404 for providing network access to the computer through the ISD 202 and an encryption engine 408. Specific functions of the cache engine 403 include managing (1) the main CPU interface 401 and the system interface 402 to the computer 201, (2) the pass-thru connection 404 that the computer 201 may use to access network servers 111, 112, (3) the files stored within the cache 406, (4) the operation of the removable media storage component 407, and (5) the network interface 405 to the network. The cache engine 403 also processes file requests from the applications and operating system of the computer and commands received from an SISD. The overall goal of each of the components included with the ISD 202 and the functions provided by the ISD 202 is to relieve the operating system of duties associated with managing many of the typical components found in a computing device, such duties including basic management of the functions, file storage and management, protection of files and system resources from viruses and other malware, and the like.

The main CPU interface 401 and the system interface 402 enable the cache engine 403 to communicate with a computer when the ISD 202 is connected to a computer. Similarly, the network interface 405 enables the cache engine 403 to communicate with other networked devices over a communication network when the ISD 202 is connected to such a network. The main CPU interface 401 and the network interface 405 are also communicably connected to each other via the pass-thru connection 404 so that the cache engine 403 can transparently provide the computer with a network connection. The cache engine 403 may selectively monitor, control and/or process network communications to and from the computer using the pass-thru connection 404. For example, the cache engine 403 may apply access control policies or scan for malicious network communications. The cache engine 403 may also provide firewall functionality or remove virus- or spyware-infected network communications, all independent of the operating system running on the computer. By way of another example, the cache engine 403 may use the included encryption engine to encrypt outgoing and decrypt incoming network communications. Such encryption and decryption functions may be performed using any type of programmable cryptographic algorithm.

The cache engine 403 may be any type of central processing unit appropriate to control the functions of the ISD 202 as described herein. The particular type of central processing unit used is a matter of design choice. Acceptable central processing units are available from the integrated circuit divisions of vendors such as Intel, Advance Micro Devices (AMD), International Business Machines (IBM), ARM, MIPS, among others. Those skilled in the art will recognize that many alternative designs for the cache engine 403 are possible in order to manage the components and the desired functionality of the ISD 202.

For instance, many central processing units currently available already include an encryption module. Such processors can be used to encrypt files and data stored in the cache 406 or in the removable media storage component 407 or to secure network communications, whether to or from the cache engine 403 or to or from the computing device. For those processors that do not include an encryption module, an encryption module external to the processor may be used. The cache engine 403 can protect files stored on the cache 406 from unauthorized access by encrypting the files, independent of the operating system 103. The encryption/decryption keys may be embedded into the cache engine 403 itself, may be stored in a separate memory specifically provided for such a purpose (i.e. a nonvolatile memory or an external device, such as a Smartcard), or may be stored within the cache 406 for access by the cache engine 403. For a highly secure implementation, the cache engine 403 may be programmed to require "connectedness" with an SSID so that the encryption/decryption keys can be managed and supplied by the SISD 203. In such an implementation, access to the files stored in the ISD 202 is blocked if the ISD 202 is not connected to the network and able to communicate with the SSID 203. If the cache engine 403 cannot contact an SISD 203 on the network for a decryption key, the cache engine 403 would not decrypt files in the cache 406. Thus, even if the operating system of the computer is compromised, the files stored in the cache 406 would remain encrypted and fully protected because the cache engine 403 manages file encryption/decryption independent of the operating system 103. Depending on the level of security and protection desired, the cache engine 403 may be programmed to check the "connectedness" constantly, at preset intervals (e.g., every 15 minutes, every 2 hours, every day, etc.), or only when encryption/decryption functions are initiated.

The main CPU interface 401 and the network interface 405 may each be any type of appropriate interface that enables the cache engine 403 to communicate with the computer 201 and the network 109, respectively. The particular method of interconnecting the computer and the network to the ISD 202 is a matter of design choice. Methods utilizing commonly known formats such as IDE, ATA, SCSI, SATA, PATA, USB, and IEEE 1394, among others, are acceptable for the main CPU interface in block mode or file mode (native or emulated). Methods utilizing commonly known network interface types, such as Ethernet, ATM, wireless network, and cellular network, among others, and network protocols such as TCP/IP and ATM, among others, are acceptable for the network interface 405. Such components are generally widely available from a variety of computer hardware vendors as standalone components or as a part of integrated central processor units. When the computer 201 is a peripheral or a mobile device having an ISD 202, the network interface 405 may take a form of direct connection interface. A PDA, for instance, may have an internal ISD 202. The PDA may have a network interface 405, such as a wireless network interface, but may also have a direct connection to a personal computer that would act as an SISD 203.

The system interface 402 may be a simple controller that can power on or power off the computer 201 or an integrated circuit that can provide additional management functions by interfacing directly with the system board or various components of the computer 201. By utilizing the system interface 402, the cache engine 403 may send management requests to various components of the computer 201 as a pre-scheduled event or as requested from the SISD 203, which would incorporate the typical functions of known management servers. For instance, the cache engine 403 may power-cycle the computer 201 every night to clear memory leaks, to terminate unclosed applications before starting a nightly backup, or for any other desired purpose. Alternatively, or in addition, the cache engine 403 may query computer components every few minutes to see if any of the components show any signs of failure. If a problem is detected, the cache engine 403 may send an alert to a management server. The cache engine 403 may also use the system interface 402 to redirect or echo KVM to the management station as required. Essentially, the cache engine 403 may utilize the system interface 402 to provide management functions typically provided by a management interface 106 (an add-on management board or a built-in management component) as is currently practiced in the prior art. Thus, the ISD 202 eliminates the need of a separate management interface.

An ISD 202 can also provide software asset management that an add-on management board or a built-in management component cannot provide. Since the cache engine 403 not only provides computer component management functions but also manages files requests from the operating system 103 or the applications 102, an ISD 202 would be able to provide both hardware and software asset management together.

Furthermore, using known out-of-band management techniques, the cache engine 403 may also use the system interface 402 to control peripherals of the computer 201, independent of the operating system 103 or the applications 102 running on the computer 201. For instance, the cache engine 403 may control USB ports (e.g., enable or disable) so that not even a user with an administrative rights or the operating system has access to USB devices, such as USB flash memories. Since such kind of peripheral control can be centrally managed from an SISD 203 that sends necessary commands or policies to the ISD 202, by managing hardware components and software assets in this manner, the operating system can be anything and no operating system dependent management agent is required.

The particular type of storage used for the cache 406 is also a matter of design choice. The cache 406 may be any type of random access media that is known to those skilled in the art, such as a hard disk drive, DRAM, SDRAM, flash memory, or any type of random access media. The choice will generally depend on the intended usage of the associated computing device. For instance, a hard disk drive may be used for regular desktop or laptop computers; DRAM may be used if the computer needs to be completely reset when power-cycled, possibly because the contents stored in the cache need to be erased completely for security reasons; a SDRAM or flash memory may be used if the computer needs a high-performance storage with low heat dissipation; or a removable random access media may be used in an environment where the user may roam around to different computers but would want to keep the cached contents. Thus, the programming used by the cache engine 403 may be adapted to function with the particular type of random access media chosen. In addition, the cache 406 may be separated into two sections using any desirable scheme. One of the sections is designated for non-user files, which the computer is granted read-only access to, and the other is designated for user files, which the computer is granted read-write access to. For example, the cache 406 may be partitioned so that each designated section is formed by contiguous address space. Or alternatively, the two sections can be formed by non-contiguous address space, such that when a new file is written to the cache 406, the address space used by the newly written file is designated to one of the designated sections depending upon whether the file is a user file or a non-user file.

The particular type of removable media storage component 407 is also a matter of design choice. The removable media storage component 407 may be any type of random access media storage, such as a CD-ROM, CD-RW, various format and media types of DVD, a USB jump drive, or it may be any type of sequential access media storage, such as a magnetic tape cartridge. The primary use of the removable media storage component 407 is for the cache engine 403 to obtain the requested files from a removable media when the cache engine 403 cannot communicate with an SISD 203. Selected non-user files generally available from an SISD 203 may be stored on removable media so that the cache engine has access to those files at times when it cannot communicate with the SISD 203. In addition, the removable media storage component 407 may be used to pre-populate non-user files to the read-only space of the cache 406 so that some large applications do not need to be downloaded over the network connection.

The removable media storage component may also be a shared component of the computer 201 as illustrated in FIG. 3, where the operating system 103 or the applications 102 have direct use of the removable media storage component 301. Like the cache 406, the removable media storage component may be separated into sections using any scheme desirable if it is to be a shared component. Alternatively, the operating system 103 and the applications 102 may not have direct access to the removable media storage component 301, but instead have access through the ISD 202, thereby enabling the cache engine 403 to selectively control, monitor, and/or process communications between the operating system 103 or applications 102 and the removable media storage component 301. In addition, the cache engine 403 may allow or disallow use of the removable media storage component 301. For instance, the cache engine 403 may allow access to an audio CD or an encyclopedia DVD but may not allow access to MP3 files or unauthorized applications stored on removable media.

The ISD 202 may have any number of devices or interfaces embedded within, or alternatively, may be configured so that the operating system 103 and the applications 102 must access such peripheral devices or interfaces through the ISD 202. In this way, the access to peripherals can be controlled independent of the operating system 102, as the cache engine 403 can allow or disallow the access based on access rules or policies that may be centrally managed by an administrator. Being able to centrally control peripheral access, independent of the operating system, is a valuable ability in a highly secure environment. For instance, a user would not be able to save sensitive files to a removable media if the ISD 202 does not allow the access to the removable media storage component 407. The user would also not be able to boot with an alternate operating system either if the ISD 202 does not allow access to any bootable media. In short, the ISD 202 can be programmed to control various components of a computer, while managing files stored on the cache 406 and interact with the computer and network as needed.

Figure 5:
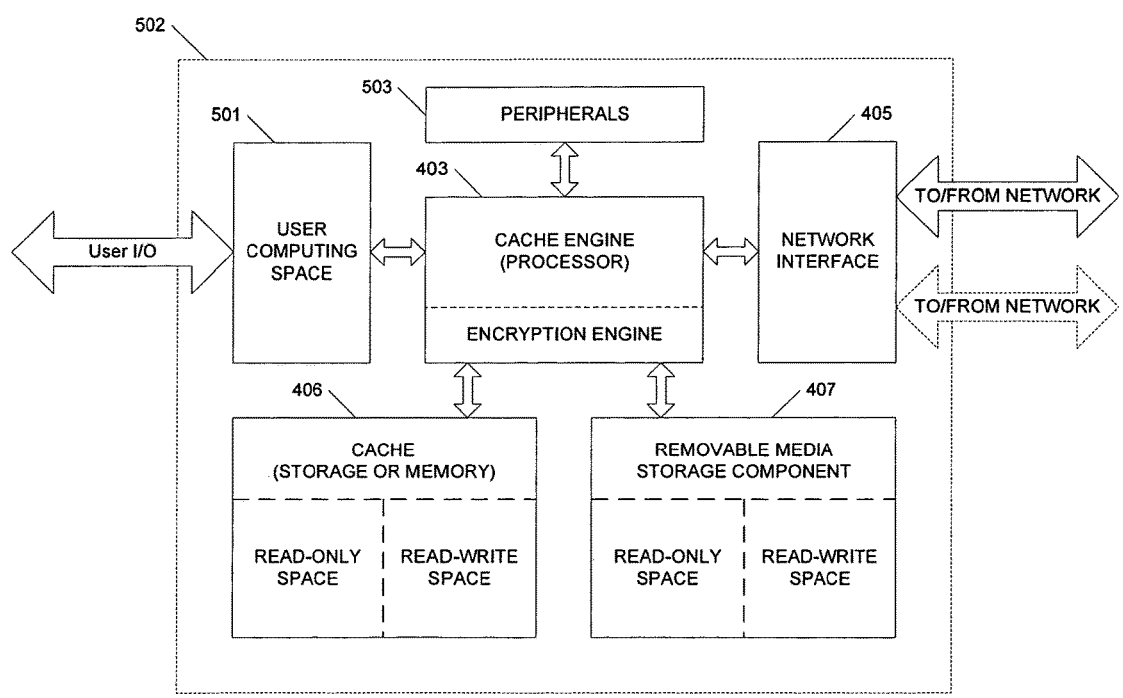
FIG. 5 is a schematic diagram of a second intelligent storage device.

FIG. 5 illustrates an ISD 502 that is configured to be the primary component of a computing device. The cache engine 403 is configured to interface with the other peripherals 503 directly, and the ISD 502 is configured so that the computing device has access to the peripherals 503 only through the cache engine 403. The ISD 502 has a user computing space 501 that may be configured to include the basic components of a programmable computing device: a performance CPU, which can deliver fast execution of applications and the chosen operating system, a typical primary random access memory used by the CPU, and user I/O interfaces for keyboard, mouse, and video. Access to all other components is managed by the cache engine 403 so that the operating systems and applications running within the user computing space 501 do not have direct access to files stored on the cache 406 or peripheral devices 503. In addition, the ISD 502 does not include a user I/O interface to the cache engine 403 so that the functionality of the cache engine 403 is not hindered by the user or the operating system or applications running within the user computing space 501. Therefore, non-user files cached on the first designated storage section can be protected or access to any attached peripheral, outside of those permitted within the user computing space 501, can be controlled as explained above.

In a typical implementation of the ISD 502, the processor used as for the cache engine 403 does not need to be a high-performance processor, as its duties are limited to file management and access control. For instance, the processor does not have to be powerful enough for large spreadsheet calculations, graphics renderings, etc., as such demand for high performance would only be expected of the CPU used in the user computing space 501. Nevertheless, the user computing space 501 can be virtualized without losing the concept of the ISD 502, as long as direct access of the virtualized computing space to the cache engine 403 is limited in accordance with the concepts set forth herein. Furthermore, regardless of the user computing space 501 being physically composed of a CPU and a memory or virtualized, the user I/O can be a locally attached keyboard, mouse, and video, or remote keyboard, mouse, and video extended over a network.

The programming of the ISD may be in any programming language, such as C++, Java, and the like, and the compiled program may be embedded into the cache engine 403 itself, or it may be stored in a separate memory specifically provided for such a purpose (e.g., an updateable firmware). Alternatively, the programming may be stored within the cache 406 for access by the cache engine 403. Mainly, the programming permits the cache engine 403 to communicate with an associated computing device, giving the computing device access to files stored in the cache 406 on a read-only basis for non-user files or on a read-write basis for user files. Depending on the type of the main CPU interface 401, the programming may provide emulated block-level access or file-level access to the files stored in the cache 406. The programming may also permit the cache engine 403 to communicate with a network through the network interface 405, using any appropriate network protocol.

Figure 6:
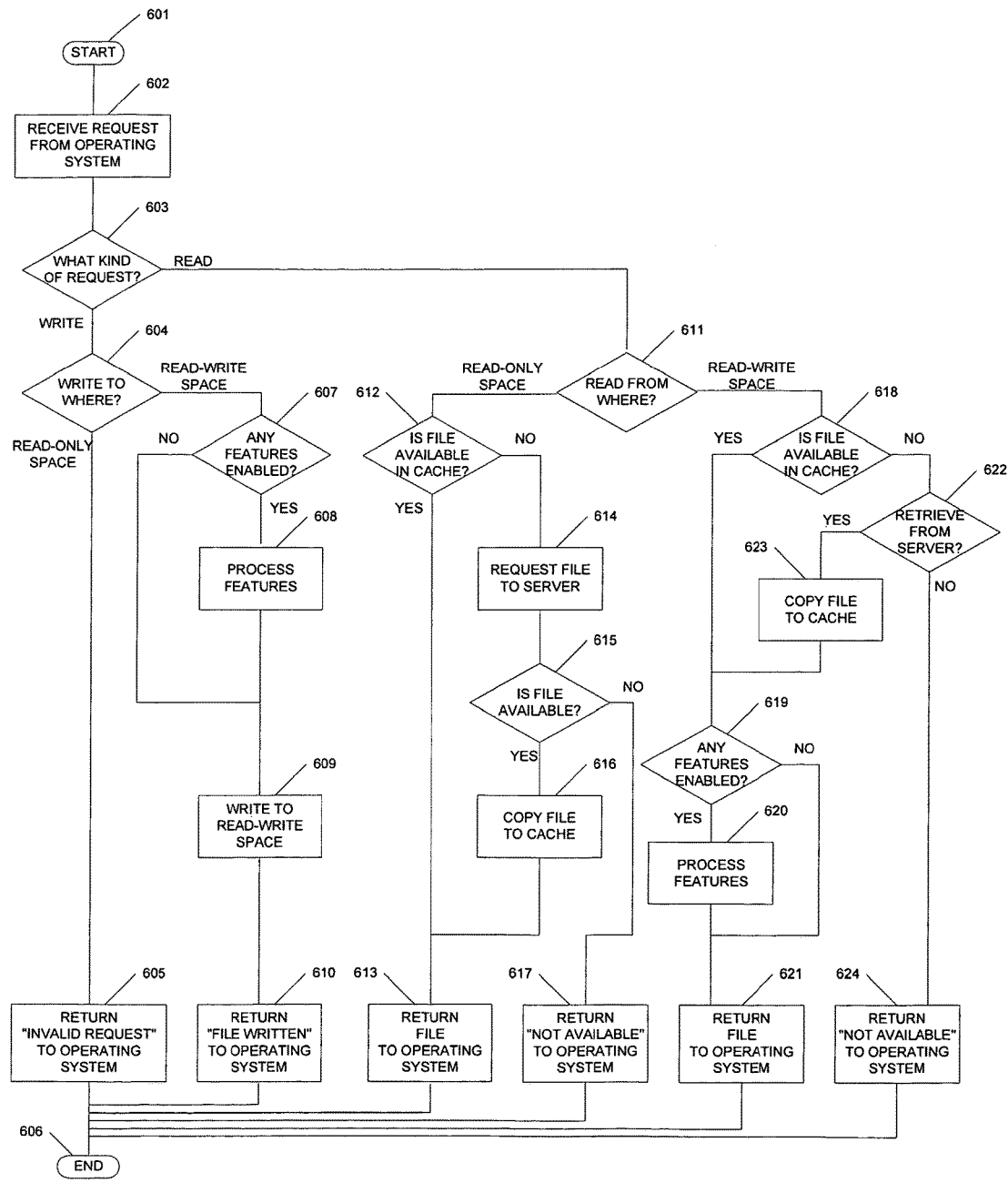
FIG. 6 is a flow chart illustrating an algorithm the intelligent storage device may use in response to a file request from a computer.

FIG. 6 is a flowchart showing logic the cache engine preferably follows in responding to a request from the operating system. Since the operating system typically handles read and write operations for applications through application programming interfaces, this same logic would be used for application requests as well. When a request 602 is received from the operating system, the cache engine checks whether the request is for a file read or write 603. If the request is for a file write, the cache engine determines if the file write request is to the read-only designated space or to the read-write designated space 604. If the file write request is to the read-only designated space, the cache engine rejects the request by returning an "Invalid Request" notice to the operating system 605. If the file write request is to the read-write designated space, the cache engine writes the file to the read-write designated space 607 while processing any features 609, such as virus scanning, encryption, backup, and the like. The particular order of feature processing would depend on the feature. For instance, the cache engine may scan the file for a virus before writing the file to the read-write cache. If a virus is found, further action may be taken such as placing the file in quarantine, or denying the write operation completely. In addition, the cache engine may back up the file to a file server after writing the file to the read-write cache, or it may archive the file to removable media. Once the file is successfully written to the read-write designated cache, with all desired features having been performed, the cache engine returns a "File Written" notice to the operating system 610.

If the cache engine determines 603 that the request is for a file read, then the cache engine determines 611 if the file read request is for a file located in the read-only designated space, i.e., a non-user file, or for a is for a file located in the read-write designated space, i.e., a user file. If the file request is for a non-user file, the cache engine determines 612 if the non-user file is available from the read-only designated cache. If the requested non-user file is available from the read-only designated cache, the cache engine returns 613 the non-user file to the operating system. If the requested non-user file is not available from the read-only designated cache, the cache engine sends a request 614 for the non-user file to an SISD. The request may be in the form of a broadcast to any and all SISD on the network, or it may be made to a specific SISD on the network. The method would depend on the particular network the ISD is connected to. From the request to the SISD, the cache engine determines 615 if the requested non-user file is available from an SISD over the network. If the requested non-user file is available, the cache engine retrieves the non-user file from the SISD and copies 616 it to the read-only designated space. Then the cache engine returns 613 the non-user file to the operating system 613. If the requested file is not available from an SISD, the cache engine notifies the operating system by returning 617 a "Not Available" notice to the operating system.

If the requested file is a user file residing in the read-write designated space, the cache engine determines 618 if the file is available from the read-write designated space. If the requested user file is not available, the cache engine checks 622 if retrieval of the file from a file server is permitted and possible. The file may be available from a file server from a past backup or archive procedure. If so, the cache engine retrieves the user file from a file server and copies 623 to the read-write designated space. When the file is available, whether directly from the cache or copied from a file server, the cache engine determines 619 if any features are enabled and processes 620 the enabled features. Once the features are processed, or if features are not enabled, the file is returned 621 to the operating system. Again, the particular order of feature processing depends upon the feature set being processed. For instance, if an automatic backup is enabled, the cache engine first compares the user file locally stored in the read-write designated space with the user file stored as a backup on a file server and provides the computer with the latest version of the user file. If the file is not available in the cache and not available on the file server, the cache engine notifies the operating system by returning a "Not Available" notice 624 to the operating system.

The actual logic that the cache engine follows in responding to a request from the operating system may take different forms, depending on the needs of the particular implementation. Those skilled in the art will recognize that many alternative logics are possible for managing the file requests while separately keeping the read-only space and the read-write space and safely providing read-only access to non-user files in the manner described herein.

The ISD described herein is operating system independent and is not constricted by having to conform to any particular protocols or file structures. An operating system interacting with the ISD needs to be programmed only with the protocol needed to request files stored on the ISD, and the operating system can dispense with file storage and maintenance tasks if the ISD is the only storage peripheral or the only source for connected storage peripherals. Advantageously, communications between the operating system and the ISD may be performed using a small number of procedures. These procedures would be the only ones dependent on the operating system and system architecture, and they can be standardized on any hardware platform.

Thus, an intelligent computer storage device having separate read-only space and read-write space, removable media component, system management interface, and network interface is disclosed. While embodiments of this invention have been shown and described, it would be apparent to those skilled in the art that many more modifications are possible without departing from the inventive concepts herein. The invention, therefore, is not to be restricted, except in the spirit of the following claims.

What is claimed is:

1. A computing device comprising:
a computer processor;
a system management processor;
a network interface communicably coupling the computer and system management processors to a network;
an interface bus communicably coupling the computer processor to the system management processor and to one or more hardware components of the computing device;
a CPU interface communicably coupling the system management processor to the interface bus, wherein the CPU interface is configured to provide the system management processor with communication functionality to the computer processor;
a system management interface communicably coupling the system management processor to the interface bus separately from the CPU interface, wherein the system management interface is configured to provide the system management processor with management functionality over the one or more hardware components of the computing device, and the system management processor is configured to control the one or more hardware components using the management functionality, said control being independent of an operating system running on the computer processor; and
storage means communicably coupled to the system management processor, wherein the system management processor regulates access of the computer processor to the storage means.

2. The computing device of claim 1, wherein the storage means comprises random access media.

3. The computing device of claim 1, wherein the system management processor is configured to give the computer processor:
read-only access to a first storage section of the storage means, and
read-write access to a second storage section of the storage means, the second storage section being separately contiguous from the first storage section.

4. The computing device of claim 1, wherein the system management processor is configured to deny the computer processor access to the storage means.

5. The computing device of claim 1, further comprising a removable media storage component communicably connected to the system management processor.

6. The computing device of claim 5, wherein the system management processor regulates access of the computer processor to the removable media storage component.

7. The computing device of claim 1, further comprising an encryption module communicably coupled to the system management processor, the system management processor being configured to utilize the encryption module for at least one of:

encrypt network communications through the network interface; and
   encrypt files stored on the storage means.

8. The computing device of claim 7, wherein the system management processor is configured to obtain an encryption key through the network from a predetermined server, the encryption key being utilized to perform encryption with the encryption module.

9. The computing device of claim 1, wherein the system management processor is configured to regulate all files stored on the storage means.

10. The computing device of claim 9, wherein the system management processor is configured to communicate with a predetermined server over the network and to remove one or more stored files from the storage means in accordance with a delete instruction received from the predetermined server.

11. The computing device of claim 9, wherein the system management processor is configured to regulate all files stored on the storage means in accordance with pre-established rules.

12. The computing device of claim 11, wherein the system management processor is configured to communicate with a predetermined server over the network, and the system management processor is configured to manage the pre-established rules in accordance with commands received from the predetermined server.

13. The computing device of claim 1, wherein the system management processor is configured to regulate all network traffic passing through the network interface to and from the computing device.

14. The computing device of claim 13, wherein the system management processor is configured to regulate all network traffic passing through the network interface to and from the computing device in accordance with pre-established rules.

15. The computing device of claim 14, wherein the system management processor is configured to communicate with a predetermined server over the network, and the system management processor is configured to manage the pre-established rules in accordance with commands received from the predetermined server.

16. The computing device of claim 1, wherein the system management processor is configured to control the one or more hardware components in accordance with pre-established rules.

17. The computing device of claim 16, wherein the system management processor is configured to communicate with a predetermined server over the network, and the system management processor is configured to manage the pre-established rules in accordance with commands received from the predetermined server.

18. The computing device of claim 1, wherein the one or more hardware components comprises the computer processor.

19. The computing device of claim 1, wherein the computing device is a telephone.

20. A computing device comprising:
   a computer processor;
   a management module comprising:
      a management processor;
      a first network interface communicably coupling the management processor to a network;
      a computer interface communicably coupling the management processor to the computer processor;
      a one or more component management interfaces communicably coupling the management processor to one or more hardware components of the computing device, the one or more component management interfaces being separate from the computer interface, wherein the one or more component management interfaces are configured to provide the management processor with management functionality over the one or more hardware components; and,
   storage means communicably coupled to the computer processor and the management processor, wherein the management processor regulates access of the computer processor to the storage means.

21. The computing device of claim 20, further comprising a second network interface communicably coupling the computer processor to a network.

22. The computing device of claim 21, wherein the management processor is configured to control the second network interface in accordance with pre-established rules.

23. The computing device of claim 22, wherein the management processor is configured to communicate with a predetermined server over the network, and the management processor is configured to manage the pre-established rules in accordance with commands received from the predetermined server.

24. The computing device of claim 20, wherein the computing device is a telephone.

* * * * *